(12) United States Patent
O'Rourke et al.

(10) Patent No.: US 7,496,643 B2
(45) Date of Patent: *Feb. 24, 2009

(54) WRAPPER PLAYLISTS ON STREAMING MEDIA SERVICES

(75) Inventors: Bret P. O'Rourke, Kirkland, WA (US); Dawson F. Dean, Redmond, WA (US); Anton Kucer, Kirkland, WA (US)

(73) Assignee: Microsoft Corporation, Remond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/757,921

(22) Filed: Jun. 4, 2007

(65) Prior Publication Data

US 2007/0233784 A1 Oct. 4, 2007

Related U.S. Application Data

(60) Continuation of application No. 11/054,875, filed on Feb. 10, 2005, which is a division of application No. 09/892,922, filed on Jun. 26, 2001, now Pat. No. 7,076,478.

(51) Int. Cl.
*G06F 15/16* (2006.01)

(52) U.S. Cl. .............. 709/219; 709/217; 709/239; 709/201

(58) Field of Classification Search .......... 709/231, 709/217, 232, 201, 239; 455/419
See application file for complete search history.

(56) References Cited

U.S. PATENT DOCUMENTS

| | | |
|---|---|---|
| 5,262,964 A | 11/1993 | Bonsall et al. |
| 5,737,619 A | 4/1998 | Judson |
| 5,740,549 A | 4/1998 | Reilly et al. |
| 5,787,262 A | 7/1998 | Shakib et al. |
| 5,859,660 A | 1/1999 | Perkins et al. |
| 5,941,951 A | 8/1999 | Day et al. |
| 5,951,646 A | 9/1999 | Brandon |
| 5,974,503 A | 10/1999 | Venkatesh et al. |
| 5,991,306 A | 11/1999 | Burns et al. |
| 5,996,015 A | 11/1999 | Day et al. |
| 6,023,731 A | 2/2000 | Chawla |
| 6,061,686 A | 5/2000 | Gauvin et al. |
| 6,128,627 A | 10/2000 | Mattis et al. |

(Continued)

FOREIGN PATENT DOCUMENTS

EP 0984584 A1 3/2000

OTHER PUBLICATIONS

"Advanced Systems Format (ASF) Specification" Microsoft Europe Feb. 2001 19 pages.

(Continued)

*Primary Examiner*—Thong H Vu
(74) *Attorney, Agent, or Firm*—Lee & Hayes, PLLC

(57) ABSTRACT

Systems and methods for combining streaming media content items for streaming to a client computer across a network are described. In one aspect, a server computer receives a request from a client computer for one or more content items. Responsive to receiving the request, the server computer identifies a data structure that refers to the one or more further content items. The server computer modifies the data structure to reference the requested content items. The server computer provides the content items referenced by the modified data structure to the requesting client computer for streaming media content to a user.

12 Claims, 5 Drawing Sheets

U.S. PATENT DOCUMENTS

| | | | |
|---|---|---|---|
| 6,134,244 | A | 10/2000 | Van Renesse et al. |
| 6,141,693 | A | 10/2000 | Perlman et al. |
| 6,151,598 | A | 11/2000 | Shaw et al. |
| 6,195,436 | B1 | 2/2001 | Scibora et al. |
| 6,216,175 | B1 | 4/2001 | Sliger et al. |
| 6,226,672 | B1 | 5/2001 | DeMartin et al. |
| 6,298,373 | B1 | 10/2001 | Burns et al. |
| 6,314,451 | B1 | 11/2001 | Landsman et al. |
| 6,345,256 | B1 | 2/2002 | Milsted et al. |
| 6,349,797 | B1 | 2/2002 | Newville et al. |
| 6,354,903 | B1 | 3/2002 | Nelson |
| 6,356,903 | B1 | 3/2002 | Baxter et al. |
| 6,356,971 | B1 | 3/2002 | Katz et al. |
| 6,361,326 | B1 | 3/2002 | Fontana et al. |
| 6,366,914 | B1 | 4/2002 | Stern |
| 6,389,467 | B1 | 5/2002 | Eyal |
| 6,412,011 | B1 | 6/2002 | Agraharam et al. |
| 6,424,966 | B1 | 7/2002 | Meyerzon et al. |
| 6,446,080 | B1 | 9/2002 | Van Ryzin et al. |
| 6,449,661 | B1 | 9/2002 | Fujishima |
| 6,484,199 | B2 | 11/2002 | Eyal |
| 6,553,404 | B2 | 4/2003 | Stern |
| 6,557,001 | B1 | 4/2003 | Dvir et al. |
| 6,564,263 | B1 | 5/2003 | Bergman et al. |
| 6,574,609 | B1 | 6/2003 | Downs et al. |
| 6,581,102 | B1 | 6/2003 | Amini et al. |
| 6,938,170 | B1 * | 8/2005 | Kraft et al. ............... 726/23 |
| 6,948,166 | B2 | 9/2005 | Barfield et al. |
| 6,990,497 | B2 | 1/2006 | O'Rourke et al. |
| 7,017,120 | B2 | 3/2006 | Shnier |
| 7,028,071 | B1 * | 4/2006 | Slik ............... 709/201 |
| 7,130,616 | B2 | 10/2006 | Janik |
| 7,203,758 | B2 | 4/2007 | Cook et al. |
| 7,209,892 | B1 | 4/2007 | Galuten et al. |
| 7,219,304 | B1 | 5/2007 | Kraenzel et al. |
| 7,299,409 | B2 * | 11/2007 | Joshi et al. ............... 715/716 |
| 7,308,504 | B2 * | 12/2007 | Satuloori et al. ............ 709/232 |
| 2001/0013061 | A1 | 8/2001 | DeMartin et al. |
| 2001/0014103 | A1 | 8/2001 | Burns et al. |
| 2001/0019658 | A1 | 9/2001 | Barton et al. |
| 2001/0036355 | A1 | 11/2001 | Kelly et al. |
| 2001/0053944 | A1 | 12/2001 | Marks et al. |
| 2002/0042741 | A1 | 4/2002 | Wilson et al. |
| 2002/0053078 | A1 | 5/2002 | Holtz et al. |
| 2002/0059643 | A1 | 5/2002 | Kitamura et al. |
| 2002/0067730 | A1 | 6/2002 | Hinderks et al. |
| 2002/0072967 | A1 | 6/2002 | Jacobs et al. |
| 2002/0091762 | A1 | 7/2002 | Sohn et al. |
| 2002/0104096 | A1 | 8/2002 | Cramer et al. |
| 2002/0116517 | A1 | 8/2002 | Hudson et al. |
| 2002/0131496 | A1 | 9/2002 | Vasudevan et al. |
| 2002/0138844 | A1 | 9/2002 | Otenasek et al. |
| 2002/0180803 | A1 | 12/2002 | Kaplan et al. |
| 2003/0005152 | A1 * | 1/2003 | Diwan et al. ............... 709/239 |
| 2003/0018797 | A1 | 1/2003 | Dunning et al. |
| 2003/0093790 | A1 * | 5/2003 | Logan et al. ............... 725/38 |
| 2004/0015890 | A1 | 1/2004 | Wong et al. |
| 2004/0019658 | A1 * | 1/2004 | Plastina et al. ............... 709/217 |
| 2004/0162787 | A1 | 8/2004 | Madison et al. |
| 2004/0215718 | A1 | 10/2004 | Kazmi et al. |
| 2004/0253945 | A1 * | 12/2004 | Janik ............... 455/419 |
| 2005/0177401 | A1 * | 8/2005 | Koeppel et al. ............... 705/4 |
| 2005/0240297 | A1 | 10/2005 | Scotzin et al. |
| 2006/0031551 | A1 | 2/2006 | Agresta et al. |

OTHER PUBLICATIONS

Ayers, et al., "Synchronized Multimedia Integration Language (SMIL 2.0) Specification" W3C Proposed Recommendation Jun. 2001 16 pages.

Chen et al., "Downloading and Stream Conversion: Supporting Interactive Playout of Videos in a Client Station" Proceedings of the International Conference on Multimedia Computing and Systems 1995 pp. 73-80 May 1995 IEEE Press.

Gutfreund, et al., "Circus Talk: An Orchestration Service for Distributed MultiMedia" Proceedings of the first ACM International Conference on Multimedia pp. 351-358 Sep. 1993 ACM Press.

Hilal, "A Survey on MPEG-7 A Multimedia Content Description Interface", prepared for Prof. Javed I. Khan, Dept of Computer Science, Kent State University, Nov. 2001, 24 pages.

Press Release: W3C Issues First Public Draft of Synchronized Multimedia Integration Langugage (SMIL). pp. 1-3. Dec. 1997. Available on the Internet at http://www.w3.org/Press/SMIL.

Rehm, "Representing Internet Streaming Media Metadata using MPEG-7 Multimedia Description Schemes" Proceedings of the 2000 ACM Workshops on Multimedia. p. 93-98. Nov. 2000. ACM Press.

Roth, "Windows Media Services Hercules Release: Cache & Proxy" Microsoft Corporation 2000 25 pages.

Shulman, "Advanced Systems Format Specification" Microsoft Digital Media Division Feb. 2001 18 pages.

Synchronized Multimedia Integration Language (SMIL) 1.0 Specification. pp. 1-42. Jun. 1998. Available on the Internet at http://www.w3.org/TR/.REC-smil/.

* cited by examiner

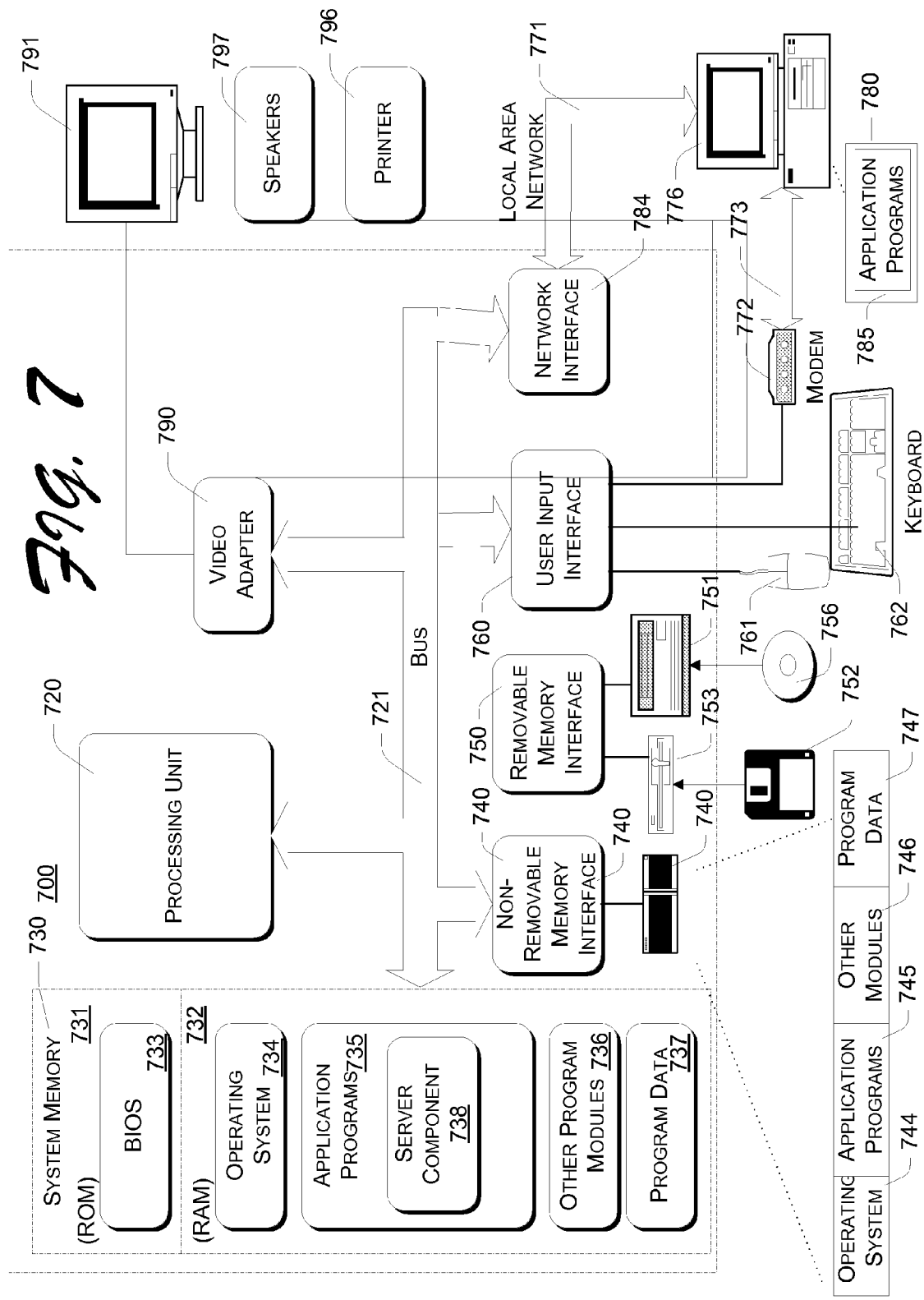

WRAPPER PLAYLISTS ON STREAMING MEDIA SERVICES

RELATED APPLICATION

This patent application is a continuation of co-pending U.S. patent application Ser. No. 11/054,875 filed on Feb. 10, 2005, titled "Wrapper Playlists on Streaming Media Services", commonly owned herewith, and hereby incorporated by reference. U.S. patent application Ser. No. 11/054,875 is a divisional of U.S. Pat. No. 7,076,478, filed on Jun. 26, 2001, and issuing on Jul. 11, 2006.

TECHNICAL FIELD

This disclosure relates to networked client/server systems and to methods of delivering requested content in such systems. More particularly, the subject matter relates to systems and methods for delivering client requested content to the client along with additional content.

BACKGROUND

When a client requests a piece of content such as digital video, audio, or some other content from a server, the client typically provides a global address to the content in the form of a Uniform Resource Locator (URL). The server then accesses the addressed content and sends or "streams" it to the client in the form of a continuous digital data stream.

There are various file data formats for streaming digital media content and composite media streams. "Advanced Streaming Format" (ASF) is an example of such a data file format. ASF (sometimes referred to as WINDOWS Container Media Format) specifies a way in which multimedia data content is stored, streamed, and presented by a variety of tools, servers, and clients of a number of different multimedia vendors. ASF provides a storage and transmission data file format that encapsulates multimedia data types (e.g., images, audio, and video) as well as embedded text (e.g., a URL) and also allows for synchronizing these objects within a digital data stream. (Further details about ASF are available from Microsoft Corporation of Redmond, Wash.).

Regardless of which of a number of different streaming file data formats is used, an individual data stream includes a sequence of digital data sets or units. The units represent an image, sound, or some other stimuli that is perceived by a human to be continuously varying. The client renders the units individually, in sequence, to reproduce the original stimuli. For example, an audio data stream comprises a sequence of sample values that are converted to a pitch and volume to produce continuously varying sound. A video data stream comprises a sequence of digitally specified graphics frames that are rendered in sequence to produce a moving picture.

In the simplest case, a client requests a single streaming media content file, to reproduce, or "play" a single piece of content such as a song or a video. Alternatively, the client may request a playlist, or "playlist file" that includes a number of different references to individual streaming media content files. Each playlist file includes information such as information to reference specific pieces of content, an order in which to play the referenced content, and other information (e.g., whether to play certain pieces of referenced content more than one time). In other words, a playlist file not only references media content, but also describe how pieces of media content are combined.

Playlists do not normally contain the actual media data, but rather particular references (i.e., a URL) to stored media data. As a result, a playlist file is typically small in size, generally only contains text, and is typically easy and computationally inexpensive to modify. (A reference to a single piece of media content may appear in any number of different playlist files).

A playlist is typically created in predetermined format. The Synchronized Multimedia Integration Language (version. 2.0), referred to as "SMIL" is an example of such a predetermined format. SMIL is an extension of the World Wide Web Consortium (W3C) standard Extensible Markup Language (XML). SMIL provides syntax and structure to define both high-level instructions and data corresponding to the content referenced by a playlist. (The specification for SMIL is well understood in the computing industry).

A playlist can be implemented on a client computer or on a server computer. When a client implements a playlist, the playlist is typically downloaded from a server. The client interprets the downloaded playlist file to present a series of requests to the server, for every piece of content represented in the playlist. A server, upon receipt of a media content request from a client, is generally not aware that the client is requesting media content that is referenced in a client implemented, or "client-side" playlist file. This is because use of a client-side playlist is indistinguishable from a client requesting a server to play one or more respective pieces of media content one-after-the-other.

A server implemented playlist, or "server-side" playlist is maintained by a server and is not downloaded to a client. To access media content represented in a server-side playlist, a client typically selects a URL that identifies both a server and a particular playlist file. Responsive to receiving a request from the selection of such a URL, the identified server accesses the requested playlist and streams, or "plays" the media content referenced by the playlist to the requesting client, one piece of media content at a time.

Regardless of whether a playlist is implemented on a server or on a client, a playlist can play a substantially important role in building a business based on advertising, source branding, service branding, and/or other revenue basis. For example, a playlist file can allow a content provider (e.g., an Internet radio station) to embed, or combine an advertisement, a brand name, and/or other content such as multimedia content previews, radio-station identifiers and/or the like with scheduled media content. Every time that a content provider chooses to modify an advertisement, branding information, and/the like, that is embodied in a playlist, the content provider must typically modify the playlist to excise the old content to incorporate the new content. Or, the content provider can remove the old playlist and create a completely new playlist to reflect the change(s). Such playlist modifications and may be brought about for any number of reasons such as changes in business methods, regulatory constraints, audience demographics, and/or the like. It can be appreciated that a content provider such as a radio or television station may have any number of playlists (e.g., one playlist, one-hundred playlists, one thousand playlists, or more) that need to be modified, and or created to reflect such changes. Thus such playlist media content changes typically require a substantial amount of administrative overhead.

SUMMARY

Systems and methods for combining streaming media content items for streaming to a client computer across a network are described. In one aspect, a server computer receives a request from a client computer for one or more content items.

Responsive to receiving the request, the server computer identifies a data structure that refers to the one or more further content items. The server computer modifies the data structure to reference the requested content items. The server computer provides the content items referenced by the modified data structure to the requesting client computer for streaming media content to a user.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

FIG. 7 is a block diagram that illustrates aspects of an exemplary server computer to deliver additional content along with requested content to a client.

DETAILED DESCRIPTION

The following description sets forth a specific embodiment of a server component and methodology that incorporates elements recited in the appended claims. The embodiment is described with specificity in order to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Exemplary System Environment

Figure 1:
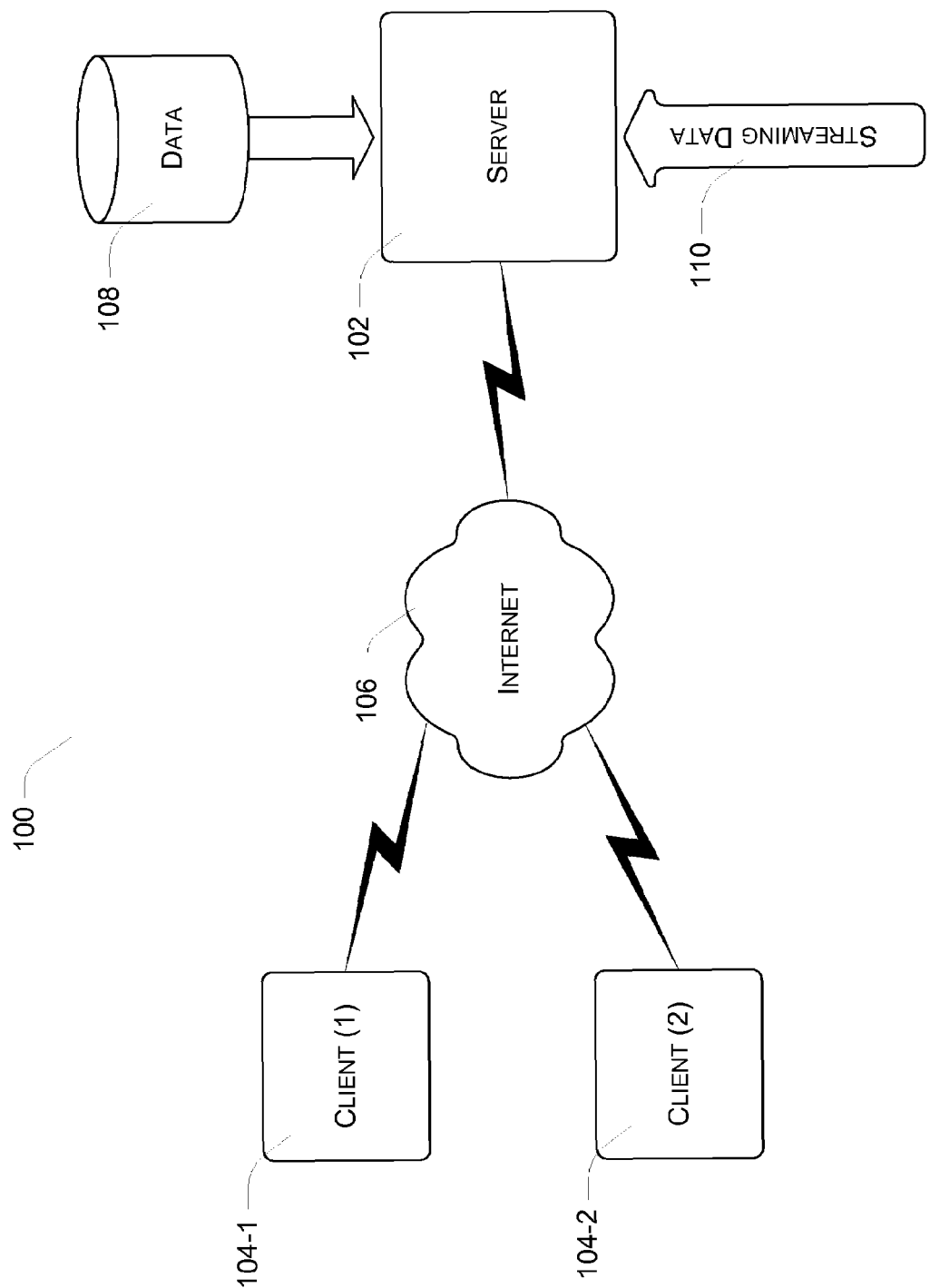
FIG. 1 is a block diagram that illustrates aspects of an exemplary system to deliver additional content along with requested content from a server to a client.

FIG. 1 shows a client/server network system 100 and environment. Generally, the system includes one or more network server computers 102 and multiple network client computers 104. The computers communicate with each other over a data communications network 106 such as the Internet. The data communications network might also comprise intranets, local-area networks and private wide-area networks. The system has associated data storage media 106.

In one embodiment, server 102 is a streaming media content server that receives URLs or other references that indicate streaming media content, files, and/or sources. For example, the URL might identify an ASF (.asf) file. A variety of requests from the client are typically received by server 102, and might identify requested content in a variety of different forms other than the URL form. Furthermore, some requests might not be processed in accordance with the technique described below. However, at least one subset of the received requests includes requests to one or more different content items that will be processed in accordance with the described technique.

In response to receiving the content request, the server 102 identifies or creates a data structure, or content template that refers to one or more other content items. In the described embodiment, the content template comprises a playlist. The playlist or other type of data structure can be created in a number of different data formats. SMIL provides an example of a suitable format.

The data structure acts as a wrapper or content template because the data structure specifies content that will wrap or frame at least a subset of the content sent by a server 102 to a client 104.

After identifying the appropriate base data structure, the server 102 modifies the data structure to reference the requested content item by inserting the requested URL into the playlist's sequence of URLs. In most cases, this modification will be performed on a copy of the base data structure. A copy of the base data structure is a duplicate playlist. After the base playlist has been modified in this manner, server 102 provides the content items referenced by the modified data structure or playlist to the client 104.

Figure 2:
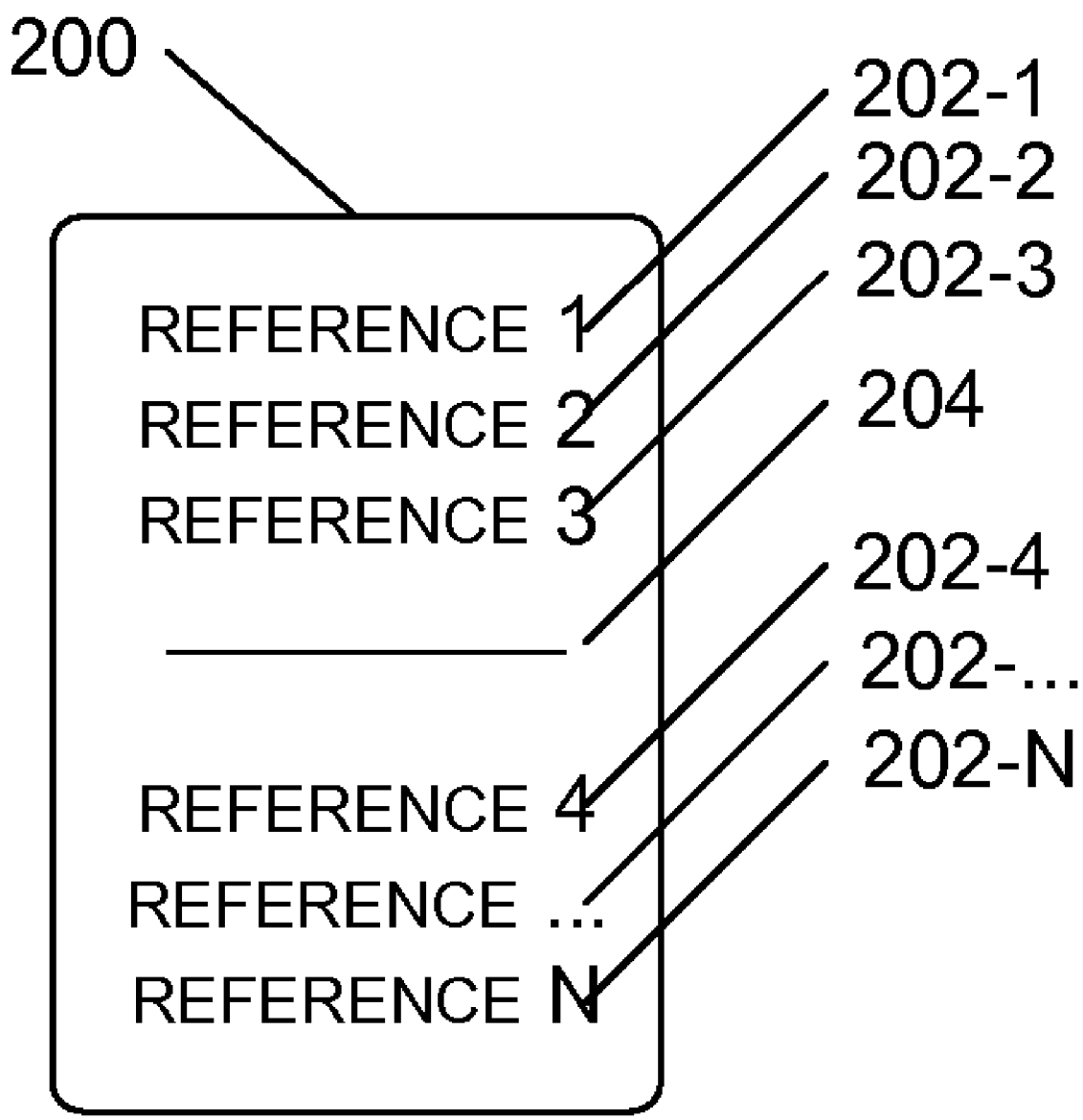
FIG. 2 is a block diagram that illustrates aspects of an exemplary playlist wrapper data structure that refers to one or more content items.

FIG. 2 shows an exemplary data structure 200 to reference one or more items of content. The data structure includes a sequence of one or more references 202 to content items. In the described implementation, the references are URLs. Additionally, the data structure includes a placeholder 204, or flag that identifies a particular point in a sequence where the reference to the client requested content is to be placed. The placeholder 204 can be located at any position with respect to the references 202.

There can be any number of placeholders 204 in the data structure 200, each placeholder identifying a particular point in a sequence where the reference to the client-requested content is to be placed. If there is more than one placeholder, the total number of placeholders is analogous to a repeat count of how may times the client requested content will be referenced in the data structure. Optionally, the number and position of each placeholder is indicated in the client's request for the content item.

Although the implementation that is described above has been applied to playlists and streaming media, there are other types of content that might benefit from this approach. For example, the client's request might be for any other type of a document or file such as a Web page (e.g., an HTML document). In this case, the data structure 200 can be represented in the file/document/Web page specification with a placeholder indicating where the requested content, or reference to the content is to be inserted.

It can be appreciated that other types and combinations of content besides streaming media files are also possible such as bitmaps, JPEGs, MPEGs, and/or the like.

Figure 3:
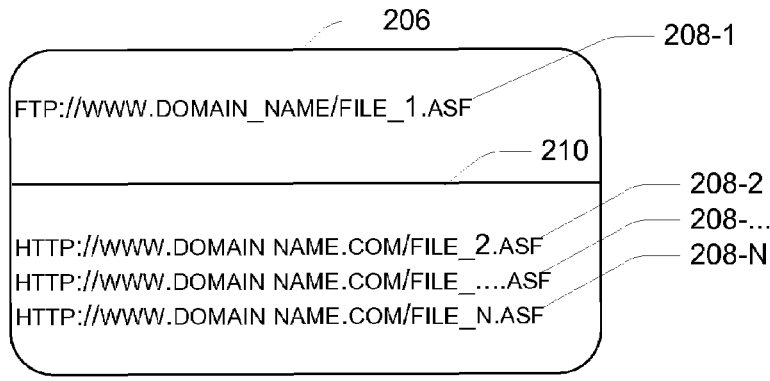
FIG. 3 is a block diagram that illustrates aspects of an exemplary playlist wrapper data structure or playlist that refers to one or more content items.

FIG. 3 is a block diagram that shows an exemplary base playlist 206 that references one or more items of streaming media content. The playlist is one example of a data structure 200 of FIG. 2. In this implementation, the playlist references streaming media content items by identifying the content items with respective URLs 208. The playlist also includes a placeholder 210, or flag to identify a particular point in a sequence where a reference to client requested content is placed. The placeholder can be located at any position with respect to the one or more references or URLs.

Figure 4:
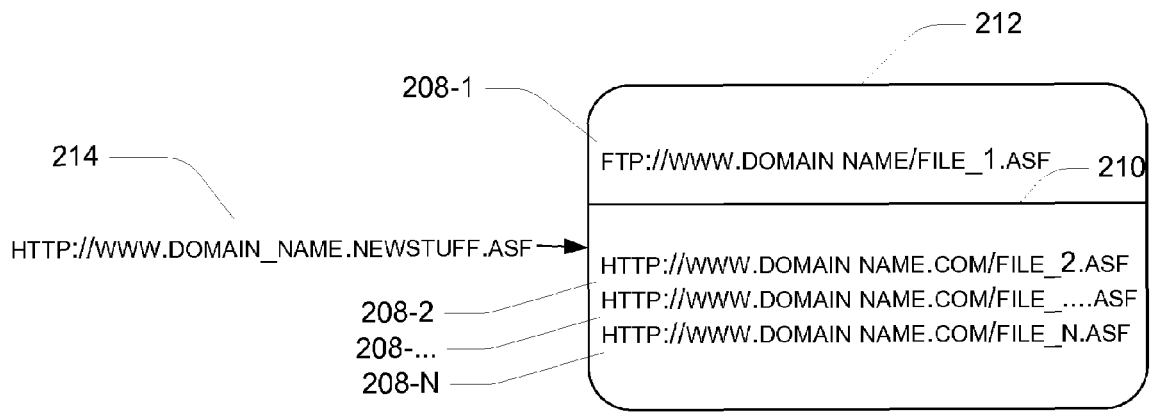
FIG. 4 is a block diagram that illustrates aspects of an exemplary copy of a playlist wrapper data structure, or playlist that refers to one or more content items.

FIG. 4 is a block diagram that shows an exemplary copy 212 of a base data structure 206 or playlist. A copy of a base data structure 206 or playlist is a duplicate data structure or playlist. The copy copy/duplicate is modified to reference client requested content item(s). Because playlist 212 is a copy of playlist 206, playlist 212 includes streaming media content references 208 and placeholder 210.

A client plays a temporary copy 212 of the wrapper playlist file 206, so modifying the temporary copy for one client request will not affect any other concurrent or future client requests. Thus, a server is able to apply a same wrapper playlist to any number of different clients that request any number of different original URL's. This is because each requesting client will play their own requested URL in a private copy of the wrapper playlist.

A URL 214 represents an item of content requested by a client. In this example, the client's content request refers to streaming media content file "newstuff.asf". Server 102 modifies playlist 212 to reference the requested content item. This modification is illustrated in FIG. 5.

Figure 5:
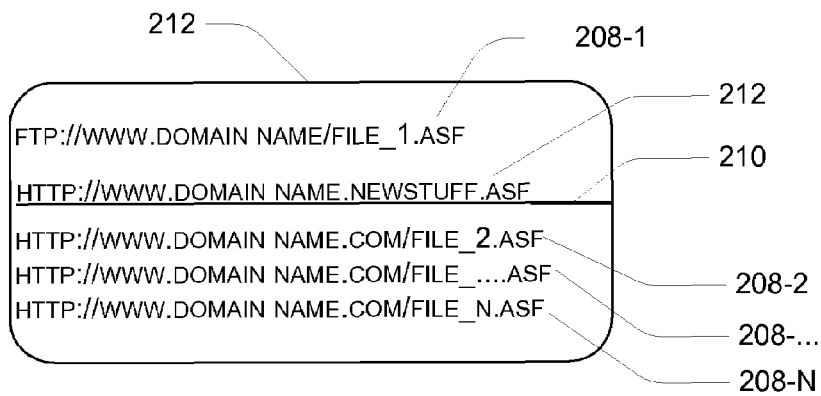
FIG. 5 is a block diagram that illustrates aspects of a modified playlist wrapper data structure or playlist that refers to one or more content items along with a client requested content item.

FIG. 5 is a block diagram that shows an exemplary playlist 212 after it has been modified. Specifically, the server 102 has inserted a URL 214 into the playlist 212 at the location identified by a placeholder 210. A server can use this technique to "wrap" other content items around a client-requested content item. The client 104 does is not required to do anything special to receive the other content items. This is because the server automatically translates the client's request for a particular content item into a request for the particular content item and the other content items.

To illustrate this, consider a playlist that includes the HTML instruction sequence shown in Table 1.

TABLE 1

EXAMPLE OF A PLACEHOLDER
IN A WRAPPER PLAYLIST

```
<HTML>
<SEQ>
    <MEDIA src="http://advertisements/ advertisement1.asf"/>
    <MEDIA src="%url%"/>
    <MEDIA src=" http://advertisements/advertisement2.asf"/>
</SEQ>
</HTML>
```

A placeholder 214 in the above HTML sequence is identified by "%url%". The server replaces every occurrence of the string "%url%" with a URL requested by the client. For example, consider a playlist that includes the HTML sequence shown in Table 2.

TABLE 2

EXAMPLE OF WRAPPING OTHER URLS AROUND A
A CLIENT REQUESTED URL

```
<HTML>
<SEQ>
    <MEDIA src="http://advertisements/ advertisement1.asf"/>
    <MEDIA src="http://serverName/FeatureMovies/BigActionMovie.asf"/>
    <MEDIA src="http://advertisements/advertisement2.asf"/>
</SEQ>
</HTML>
```

Note that the "%url%" placeholder has been replaced with a client requested URL 214 (http://serverName/FeatureMovies/BigActionMovie.asf).

In these examples, the playlists of Tables 1 and 2 are illustrated using the SMIL data format. However, the SMIL format is used for illustration purposes only, and a wrapper playlist can be generated and/or modified using instructions and/or data represented in one of a number of other multimedia integration formats.

Using a playlist structure and technique as described, allows a server to add advertisements, previews of coming attractions, or other content to a playlist sequence without having to modify an original playlist, or change a URL that corresponds to the original playlist. A data structure or playlist is not restricted to placing advertisements before a requested URL. Such playlists can be used to specify that a client will receive any stream of content that can be described by the playlist language, and that the original requested URL may appear anywhere and any number of times in this sequence of content. Moreover, as discussed above, any other playlist attributes that can be applied to content, such as repeat count and/or the like, can also be applied to the original requested content reference (e.g., a URL).

Furthermore, a data structure such as this allows an administrator to specify an advertising policy by editing the content of the playlist. The policy can easily be changed, by simply editing the base playlist. As a result, the discussed problem of configuring an advertising policy is turned into a much simpler problem of authoring an advertising template or playlist to frame or wrap all content. Authoring content is a well-understood problem and many existing tools for authoring Web content can help with this task.

In some cases, a server may store a standard playlist that is applied to all incoming client requests for content items. In other implementations, a collection of base playlists can be stored for use with different types of requests. Requests can be distinguished, for example, by a storage location of the referenced content, by a file name or extension indicated in the request, and/or by a variety of other distinguishing factors.

As discussed above, base data structures or wrappers can be useful for other types of servers besides streaming media servers. For example, a Web server typically serves Web pages that contain multiple references or URLs specified in a format such as HTML (hypertext markup language). A document such as this can be used as a template or wrapper according to the novel procedures discussed above, by including a placeholder indicating where embedded content should be located. When a client requests a Web page specification by supplying a URL reference, the server inserts this URL reference into the wrapper, in place of the placeholder, and then serves the resulting Web page.

To illustrate this, consider that a client requests a URL, for example, "http://server/doc1.htm". The Web server responds by making a temporary copy of a "wrapper" HTML document. The Web server then modifies the temporary copy by inserting the originally requested URL ("http://server/doc1.htm") into the contents of the wrapper document.

The "wrapper" HTML document may place banner advertisements and other helpful links around the originally requested content. When the modified temporary copy of the wrapper html document is presented to the user, the contents of the original URL "http://server/doc1.htm" might then appear in the middle of the wrapper document.

Exemplary Procedure

Figure 6:
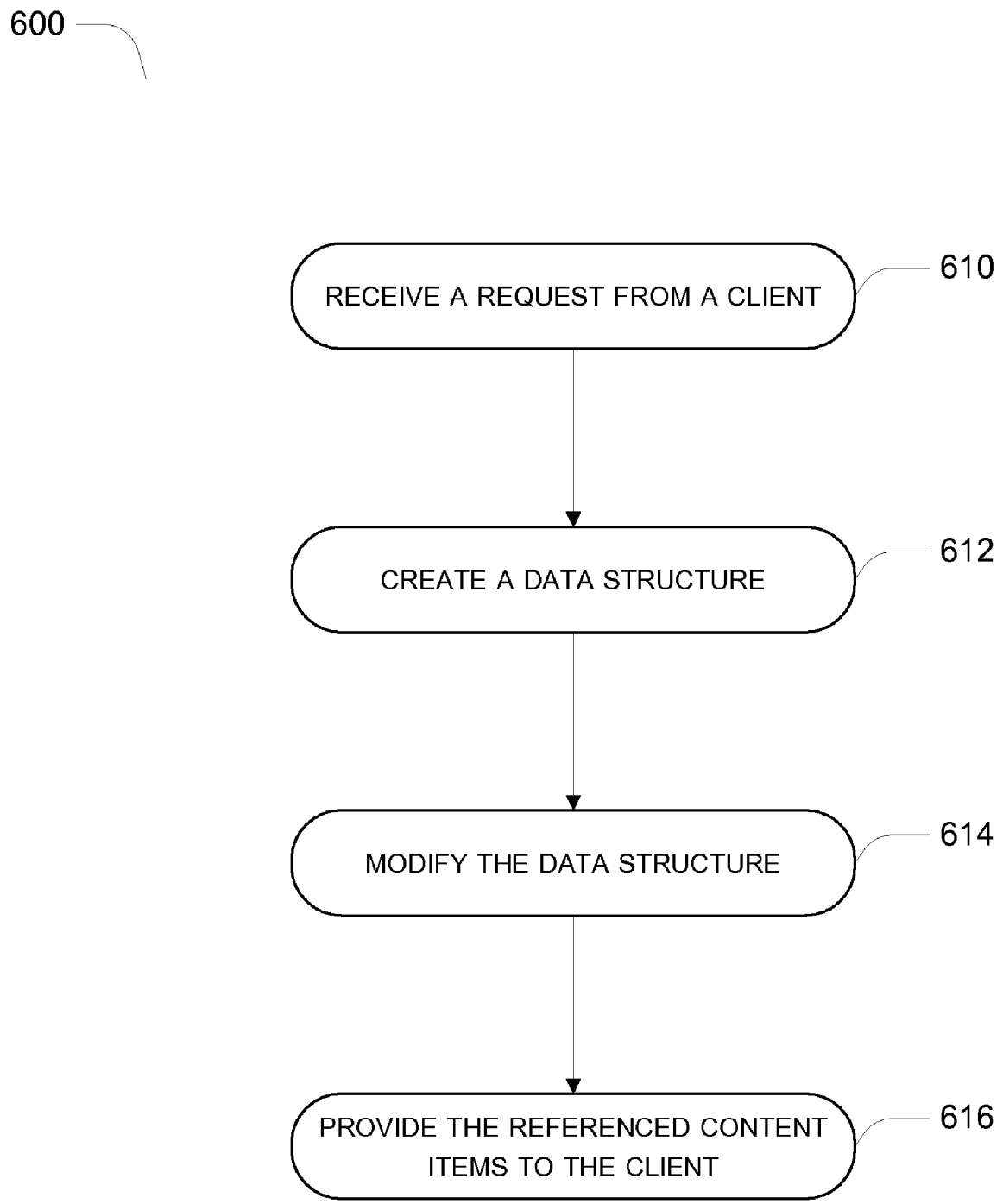
FIG. 6 is a flowchart that illustrates aspects of an exemplary methodology for a server to stream content items to a client.

FIG. 6 is a flowchart diagram that shows an exemplary procedure 600 to stream data from a server to a client. At block 610, the procedure receives a request from a client for one or more content items. At block 612, the procedure identifies a data structure that refers to one or more further content items. At block 614, the procedure modifies the data structure to reference the requested content items. At block 616, the procedure provides the requested content items (block 610) referenced by the modified data structure (block 614) to the requesting client (block 610).

Exemplary Computer Environment

FIG. 7 shows components of computer 700 that forms a suitable environment for a server computer 102 of FIG. 1. The components shown in FIG. 7 are only examples, and are not intended to suggest any limitation as to the scope of the functionality of the subject matter; the subject matter is not necessarily dependent on the features shown in FIG. 7.

Generally, various different general purpose or special purpose computing system configurations can be used. Examples of well known computing systems, environments, and/or configurations that may be suitable for use with the subject matter include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of a computer is embodied in many cases by computer-executable instructions, such as program modules that are executed by the computer. Generally, a program module includes routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The subject matter described herein includes these and other various types of computer-readable media when such media contain instructions programs, and/or modules for implementing the steps described below in conjunction with a microprocessor or other data processors. The subject matter also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 7, the components of computer 700 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 700 typically includes a variety of computer-readable media. Computer-readable media can be any available media that can be accessed by computer 700 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710.

Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 700, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

Such application programs 735 include server component 738, which responds to client requests for content by providing the requested content and additional content to the client. Aspects of an exemplary methodology of server component 738 were described above in reference to FIGS. 7-6.

The computer 700 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through an non-removable memory interface such as interface 740, and magnetic disk drive 751 and optical disk drive 755 are typically connected to the system bus 721 by a removable memory interface such as interface 750.

The drives and their associated computer storage media discussed above and illustrated in FIG. 7 provide storage of computer-readable instructions, data structures, program modules, and other data for computer 700. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 700 through input devices such as a keyboard 762 and pointing device 761, commonly referred to as a mouse, trackball, or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port, or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer may operate in a networked environment using logical connections to one or more remote computers, such as a remote computer 780. The remote computer 780 may be a personal computer, a server, a router, a network PC, a peer device or other common network node, and typically includes many or all of the elements described above relative to computer 700, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets, and the Internet.

When used in a LAN networking environment, the computer 700 is connected to the LAN 771 through a network interface or adapter 770. When used in a WAN networking environment, the computer 700 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 700, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Conclusion

Although various implementations of the described subject matter have been described in language specific to structural features and/or methodological operations, it is to be understood that the subject matter defined in the appended claims is not necessarily limited to the specific features or steps described. Rather, the specific features and operations are disclosed as exemplary forms of implementing the claimed subject matter.

The invention claimed is:

1. A method for a server computer to automatically provide content to a client computer, the method comprising:
   receiving, by the server computer, a request from the client computer for one or more requested content items; and
   responsive to receiving the request:
      identifying, by the server computer, an original data structure that refers to one or more further content items;
      copying, by the server computer, the original data structure to create a copy of the original data structure;
      modifying, by the server computer, the copy of the original data structure to reference the requested content items, wherein the copy of the original data structure further comprises a placeholder that identifies a particular point in a sequence where the reference to the requested content is placed; and
   providing, by the server computer, the content items referenced by the modified data structure to the client computer for presentation to a user.

2. The method of claim 1:
   wherein identifying the original data structure, the original data structure comprises a playlist;
   wherein receiving the request, the one or more requested content items comprises streaming media content; and
   wherein providing the content items further comprises streaming the content items referred to by the playlist.

3. The method of claim 1, wherein identifying the original data structure, the data original structure comprises a first Web page specification, and the requested content comprises a second Web page specification.

4. The method of claim 1, wherein modifying the copy of the original data structure further comprises adding a plurality of references to the requested content item in the data structure.

5. The method of claim 1, wherein modifying the copy of the original data structure further comprises adding a plural number of references to the requested content item in the data structure, the number being indicated by the request.

6. The method of claim 1, wherein receiving the request, further comprises receiving a variety of requests from the client computer, at least one subset of the variety of requests comprising respective requests to one or more different content items.

7. A server including a processor configured to perform one or more operations comprising:
   receiving a plurality of requests from a client for one or more requested content items;
   responsive to receiving the request, and for at least a subset of the received requests:
      (a) identifying, by the server, an original data structure containing a sequence of references to one or more further content items;

(b) copying the original data structure to create a copy of the original data structure;
(c) modifying, by the server, the copy of the original data structure reference to the requested content items, wherein the copy of the original data structure further comprises a placeholder that identifies a particular point in the sequence where the reference to the requested content is placed; and
(d) communicating, by the server, the content items referenced by the modified data structure to the client.

8. The server of claim 7, wherein the original data structure comprises a playlist, the requested content comprising streaming media content, and wherein the communicating comprises streaming the content items referenced by the modified data structure to the client.

9. The server of claim 7, wherein the original data structure comprises a first Web page specification, and wherein the requested content comprises a second Web page specification.

10. The server of claim 7, wherein modifying the copy of the original data structure comprises including a plurality of references to the requested content item in the data structure.

11. The server of claim 7, wherein modifying the copy of the original data structure comprises including a plural number of references to the requested content item in the data structure, the number being indicated by the request.

12. The server of claim 7, wherein at least a subset of the received requests refer to differing content items.

* * * * *